March 20, 1934.  V. H. NALINNE  1,951,522
COMBINED WHEEL FOR ROADS AND RAILS
Filed Oct. 11, 1932
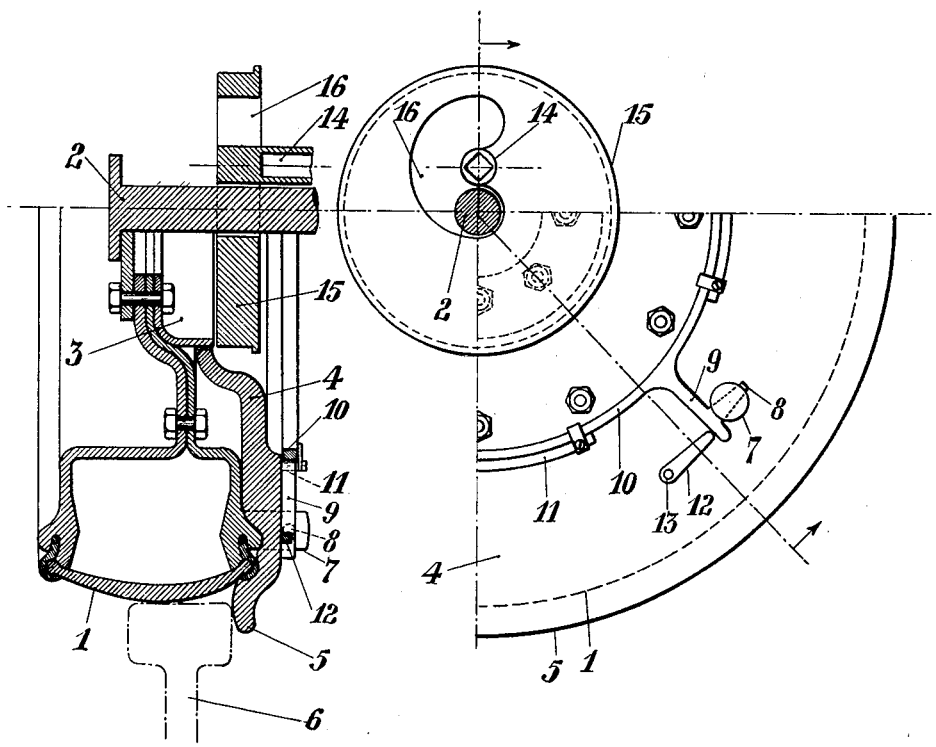
Inventor:
Victor Henri NALINNE
his Attorney Patented Mar. 20, 1934

1,951,522

UNITED STATES PATENT OFFICE 1,951,522

COMBINED WHEEL FOR ROADS AND RAILS

Victor Henri Nalinne, Brussels, Belgium

Application October 11, 1932, Serial No. 637,240
In Belgium October 16, 1931

2 Claims. (Cl. 295—8.5)

This invention relates to improvements in the construction of vehicle wheels and has reference particularly to car wheels which may be used with equal facility on roads or rails.

My invention has for its object to provide a wheel construction, which in one adjustment may be used to travel roads and highways, and which in another adjustment carries a flange for the purpose of guiding the wheel upon a rail.

I accomplish this object by means of the arrangement and combination of parts hereinafter described, set forth in the appended claims and illustratively exemplified in the accompanying drawing, in which, Figure 1 is a substantially longitudinal sectional view of the wheel showing the rail flange projected; and Figure 2 is an elevational front view of a portion of the wheel.

Referring to the drawing, 1 designates a rim of a wheel, which may be of any given type using solid or pneumatic tires, and which supports an axle 2 and a concentric inside brake drum 3.

The rim of the brake drum 3 carries a ring 4, which is concentrically disposed with respect to the wheel, and which has a profile on its inner face corresponding with the shape of one flange of the rim 1. As a result the ring 4 bears with very little friction upon the brake drum 3. The diameter of the ring 4 is somewhat greater than that of the rim and wheel 1 and as illustrated in Figure 1, the peripheral edge 5 of the ring 4 projects beyond the rim of the wheel. The edge 5 is practically a flange which is utilized when the wheel is being guided on a rail 6. The wheel and ring 4 are attached together by means of a stud or studs 7 which are integral with the wheel and projects through openings in the ring. The studs 7 are arranged uniformly about the wheel and receive locking pins or projections 8 which are carried by arms 9 projecting radially of a ring 10. The ring 10 is rotatably mounted on an annular rib or guide 11 integral with the ring 4. The pins 8 are held in the studs 7 by means of dogs 12 pivotally mounted on pins 13 and movable into position against the arms 9 on the sides thereof opposite the pins 8.

Means for actuating the device to change it from a flanged wheel to a straight road wheel and vice-versa, comprises an axle 14 arranged directly over and excentrically of the main axle 2. The axle 14 is excentrically disposed and adapted to support a solid disc 15, which is equal in diameter to that of the brake drum 3, and which is provided with a semi-circular opening 16, having the axis of the axle 14 as a center and describing a curved slot whose center line intersects the axis of the main axle 2.

When the wheel is to be used on roads or highways, the ring 4 and flange 5 are removed by turning the dogs 12 out of contact with arms 9 and then slightly rotating the ring 10 until the pins 8 are all disengaged from the studs 7. The ring 4 turns with respect to the disc 15, the axle 14 making one half a revolution. The position of the ring 4 is thus inverted, i. e. the shortest radius is turned towards the ground. The excentricity of the disc 15 is so dimensioned that when the shortest radius is directed downwardly, the ring 4 and its flange 5 do not contact with the ground. To be exact the excentricity must amount to more than one half the height of the flange 5.

Having now described my invention and the manner in which the same operates, what I claim and desire to secure by Letters Patent is:

1. Combined wheel for road and rail, comprising in combination a wheel and a removable flange constituted by a ring, studs on the inner side of said wheel for mounting the flange thereon, an annular member comprising arms and pins on said arms corresponding to said studs for securing said flange on said studs, cam means for maintaining said annular member and pins in clamping position, a member excentrically mounted with relation to the axle of the wheel, said excentrically mounted member being rotatable in a lower position to receive said flange, and in a higher position for bringing the lower edge of said flange inside the periphery of said wheel.

2. Combined wheel for road and rail, comprising in combination a wheel and a removable flange constituted by an annular plate mounted on a drum concentrical to the axle of said wheel, means for removably securing said flange to the wheel, a cylinder rotatably and excentrically mounted in relation to the axle and to said drum, said cylinder being rotatable in a lower position in correspondence with said drum to receive said detached annular plate, and in a higher position for bringing the lower edge of said annular plate inside the periphery of said wheel.

VICTOR HENRI NALINNE.